(12) United States Patent
Garrabrant et al.

(10) Patent No.: US 7,441,589 B2
(45) Date of Patent: Oct. 28, 2008

(54) ABSORPTION HEAT-TRANSFER SYSTEM

(75) Inventors: Michael A. Garrabrant, Unicoi, TN (US); Roger E. Stout, Columbus, OH (US); Michael W. Klintworth, II, Richland Township, Darke County, OH (US); Eric Collet, Village of Minerva Park, OH (US)

(73) Assignee: Cooling Technologies, Inc., Toledo, OH (US)

( * ) Notice: Subject to any disclaimer, the term of this patent is extended or adjusted under 35 U.S.C. 154(b) by 426 days.

(21) Appl. No.: 10/497,222

(22) PCT Filed: Nov. 29, 2002

(86) PCT No.: PCT/US02/38254

§ 371 (c)(1),
(2), (4) Date: Sep. 2, 2004

(87) PCT Pub. No.: WO03/048659

PCT Pub. Date: Jun. 12, 2003

(65) Prior Publication Data

US 2005/0022963 A1 Feb. 3, 2005

Related U.S. Application Data

(60) Provisional application No. 60/336,094, filed on Nov. 30, 2001.

(51) Int. Cl.
*F25B 29/00* (2006.01)

(52) U.S. Cl. .............................. 165/58; 62/238.3; 62/476

(58) Field of Classification Search .................... 165/58, 165/53, 10; 62/238.3, 476
See application file for complete search history.

(56) References Cited

U.S. PATENT DOCUMENTS

| | | | |
|---|---|---|---|
| 4,037,649 A | 7/1977 | Hartka | 165/16 |
| 4,373,347 A | 2/1983 | Howell et al. | 62/112 |
| 4,810,274 A | 3/1989 | Cheng et al. | 62/12 |
| 4,953,361 A | 9/1990 | Knoche et al. | 62/79 |
| 4,955,205 A | 9/1990 | Wilkinson | 62/94 |
| 5,231,849 A | 8/1993 | Rosenblatt | 62/238 |
| 6,101,832 A | 8/2000 | Franz et al. | 62/324.2 |
| 6,128,917 A | 10/2000 | Riesch et al. | 62/476 |
| 6,314,752 B1 | 11/2001 | Christensen et al. | 62/484 |
| 6,382,310 B1 * | 5/2002 | Smith | 165/121 |
| 6,519,956 B2 * | 2/2003 | Bagley | 62/156 |
| 6,701,729 B2 * | 3/2004 | Bagley | 62/156 |

* cited by examiner

*Primary Examiner*—Ljiljana (Lil) V Ciric
(74) *Attorney, Agent, or Firm*—Kremblas, Foster, Phillips & Pollick

(57) ABSTRACT

A waste heat source (100) is used to heat a high temperature heat transfer fluid which is used to heat an absorption heat transfer machine (10) having a generator (20), an absorber (30), a condenser (40), and an evaporator (50) operatively connected together. The high temperature heat transfer fluid can also be used to heat a load (190) such as a room space or a process. The waste heat source (100) can also be used to heat an intermediate heat transfer fluid, which can be used to heat a second load (175) such as a space, a process, or an absorption heat transfer machine. Novel flow control devices (70, 60) for controlling the flow of weak solution from generator (20) to absorber (30) or of refrigerant from condenser (40) to evaporator (50), respectively, are also described.

27 Claims, 2 Drawing Sheets

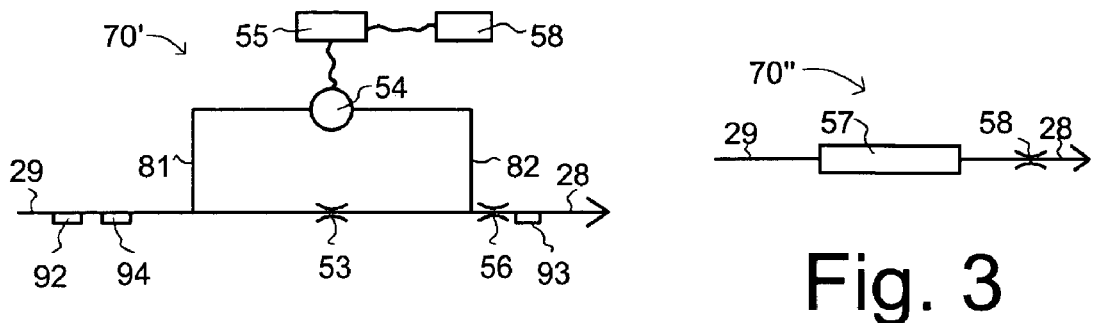
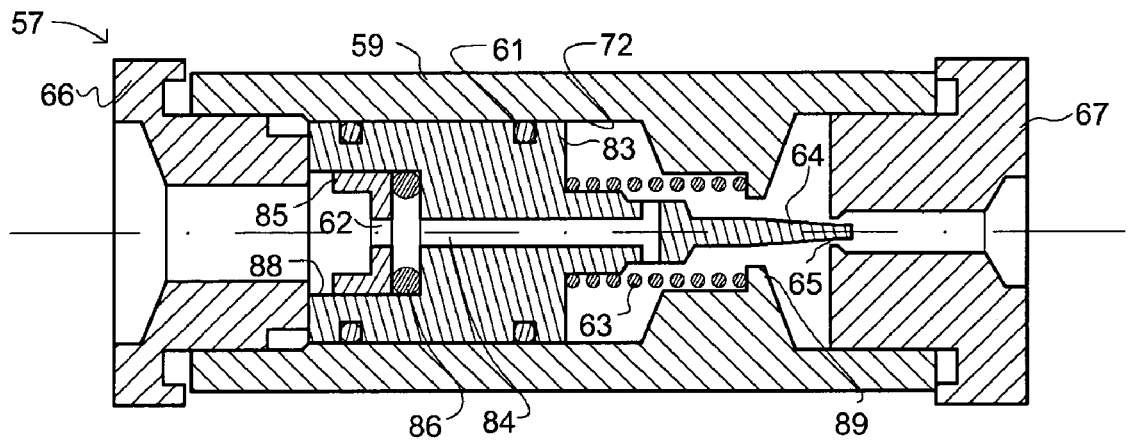

ABSORPTION HEAT-TRANSFER SYSTEM

This application is the United States national stage of and claims the benefit of PCT Application PCT/US02/38254 filed on Nov. 29, 2002(published as WO 03/048659 on Jun. 12, 2003) which claims the benefit of U.S. Provisional Application Ser. No. 60/336,094 filed Nov. 30, 2001, all of which are incorporated herein by reference as if completely written herein.

BACKGROUND OF THE INVENTION

1. Field of the Invention

This invention pertains to absorption heat-exchange systems and more particularly to high-temperature waste heat recovery systems and to control of weak solution and refrigerant flow in absorption heat-exchange systems.

2. Background of the Invention

In the past, waste heat stream recovery systems have been limited to the recovery of waste heat for relatively low temperature processes, e.g., space heating, parts cleaning, and operation of heat exchangers that require an operational temperature of less than 250° F. (121° C.). As such, previous absorption, heat-exchange machines have been limited typically to a low-temperature lithium bromide-water solution pair as the working solution.

In operating absorption heat-transfer machines, fixed restriction devices (orifices or capillary tubes) are used to control the flow of weak solution (essentially devoid of refrigerant) from the high pressure side, i.e., the generator, to the low-pressure absorber. Unfortunately such devices present a problem in that the flow rate may be lower than desired during low ambients (reduced high-side pressure) or higher than desired during high ambients (increased high side pressure). Thermal expansion valves, which vary the refrigerant flow rate, exacerbate the problem as the valve attempts to maintain an even low-side pressure.

Similar type problems exist with respect to refrigerant flow valves located between the high-pressure condenser and the low pressure evaporator. Although thermal expansion valves are available for vapor-compression systems, these valves perform poorly in absorption systems because of their low high-low side differential operating pressure. A thermal expansion valve designed for 5 refrigeration tons (RT) in a vapor compression system, is capable of 7.5 RT in an absorption system. Any attempt at using an oversized vapor-compression system valve results in a poorly functioning valve with poor control characteristics. Use of a smaller valve that does not match the absorption system capacity results in higher fluid velocities that lead to premature valve failure.

As such, it is an object of the present invention to operate the generator of an absorption heat exchanger at a solution pair (working fluid) temperature of greater than about 250° F. (121° C.) using recovered waste heat from another system.

More preferably, it is an object of the present invention to operate an absorption heat exchange machine from waste heat at a working-fluid temperature of greater than about 300° F. (149° C.).

Most preferably, it is an object of the present invention to operate an absorption heat exchange machine from waste heat at a working-fluid temperature of greater than 350° F. (177° C.).

It is a further object of the present invention to use an ammonia-water as the working fluid (solution pair) of an absorption heat-transfer machine heated with waste heat.

It is another object of the present invention to avoid degradation of the performance of the waste energy heat source.

It is an object of the present invention to use a high-temperature heat transfer fluid heated with waste heat to provide simultaneous space or process heating and a heat source for a high temperature (above 250° F. (121° C.)) absorption heat-transfer machine that provides space or process cooling.

It is an object of the present invention to alternate the use of a high pressure heat transfer fluid heat source heated with waste heat between a high-temperature absorption heat-transfer machine used for space or process cooling and second space or process heating.

It is an object of the present invention to provide an intermediate heat transfer loop based on waste heat recovery that also serves as a heat source for a high-temperature absorption heat-transfer machine.

It is an object of the present invention to use an intermediate heat transfer loop based on waste heat recovery for space heating in addition to use of the waste heat as a heating source for a high-temperature, absorption heat-transfer machine.

It is an object of the present invention to use an intermediate heat transfer loop for process heating in addition to use of the waste heat as a heating source for a high-temperature, absorption heat-transfer machine.

It is an object of the present invention to use an intermediate heat transfer loop for operating a lithium bromide absorption heat-transfer machine for cooling purposes in addition to use of the waste heat as a heating source for a high-temperature absorption heat-transfer machine.

It is an object of the present invention to improve weak solution flow control from the high to low pressure side of an absorption, heat-transfer machine.

It is an object of the present invention to provide a weak solution flow control that ensures adequate weak solution flow from the high to low pressure side of an absorption, heat-transfer machine without harsh on/off regulation.

It is an object of the present invention to provide a weak solution flow control that ensures adequate weak solution flow from the high to low pressure side of an absorption, heat-transfer machine over a wide range of pressures.

SUMMARY OF THE INVENTION

These as well as other objects are met by the present invention of an absorption, heat-transfer system comprising a first absorption heat-transfer machine with a generator, an absorber, a condenser, and an evaporator operatively connected together, with the generator and absorber having a first flow control device located between them that controls the flow of a weak solution from said generator to said absorber, with the condenser and the evaporator having a second flow control device located between them that controls the flow of refrigerant from the condenser to the evaporator. The invention utilizes a waste-heat source that passes a waste heat stream to a high-temperature heat exchanger which heats a high-temperature heat-exchange loop that comprises a pump, a heat exchange unit in the high-temperature heat exchanger for heating a high-temperature heat-transfer fluid with the waste heat stream, and a second heat exchange unit located in the heat-transfer machine for heating a solution pair such as ammonia-water in the generator to a temperature of at least about 250° F. (121°C.). Preferably, the solution pair is heated to at least 300° F. (149° C.) and most preferably to at least 350° F. (177° C.).

The waste heat stream is also used to heat either another high temperature load such as room space, a process, or another absorption heat-transfer machine by means of the high-temperature heat-transfer fluid or an intermediate temperature load which may also be a room space, a process, or an absorption heat-transfer machine. The intermediate temperature load is heated with an intermediate temperature heat transfer loop that comprises 1) an heat exchange unit for receiving heat from the waste heat stream leaving the high-temperature heat exchanger by means of an intermediate-temperature heat exchanger 2) an intermediate-temperature heat transfer fluid, 3) a pump, and 4) a second heat exchange unit for transferring heat from the intermediate-temperature heat transfer fluid to the intermediate temperature load.

A second heat source can be used for heating the generator of the absorption, heat-transfer machine when the waste-heat stream is unavailable or has insufficient heat content to heat effectively the solution pair in the generator. Lines in the high-temperature loop with appropriate fluid switching functionality such as achieved with a three way valve permit switching of the high-temperature heat-exchange fluid between the generator of the absorption machine and a second high-temperature load or operation of both in a concurrent fashion. A thermal storage tank can be used to store the high-temperature heat-transfer fluid for periods when the waste-heat stream is unavailable for heating the high-temperature heat-transfer fluid. Bypass lines in the lines carrying the waste heat stream to the high-temperature and intermediate-temperature heat exchangers allow the waste-heat stream to be diverted from these exchangers when the high-temperature or intermediate-temperature heating loops are not required.

A first embodiment of a flow control device for the flow of weak solution from the generator to the absorber comprises 1) a first restrictor that receives weak solution from a first line connected to the generator and passes the weak solution to the absorber by means of a second line, 2) a second restrictor located in the first line between the generator and the first restrictor, and 3) a weak solution by-pass line around the second restrictor with an on-off flow device. The on-off flow device is operated by a controller which is connected to an absorption cycle sensor such as temperature or pressure sensors mounted to determine the pressure and temperature on the high or low pressure sides of the absorption machine.

A second embodiment of the weak solution flow control device comprises 1) a fixed restrictor that receives weak solution from a first line connected to the generator and passes the weak solution to the absorber with a second line and 2) a variable restrictor positioned in the first line between the generator and the first fixed restrictor. The variable restrictor comprises 1) a housing having a cylindrical bore formed in it for receiving the weak solution at a first end and outputting the weak solution at a second end, 2) a cylindrical piston with a) a first end and second end that is moveably mounted in the cylindrical bore of the housing and which has a common longitudinal axis with the housing bore, b) a bore formed in it to pass weak solution from the first end to said second end of the piston; and c) a valve stem at the second end of the piston with the valve stem moveably engaging an orifice formed in said second end of the housing, typically as an orifice formed in a housing end piece; and 3) a helical spring positioned around the valve stem and contacting the second end of the piston at one end of the spring and a shoulder of the housing at its other end.

A refrigerant flow control device comprises 1) a thermal expansion valve that receives refrigerant from a first line connected to the condenser and passes the refrigerant to the evaporator in a second line, and 2) a fixed restrictor located in the first line between the condenser and the thermal expansion valve to reduce the inlet pressure to the thermal expansion valve.

A second embodiment of the flow device comprises 1) a thermal expansion valve receiving refrigerant from a first line connected to the condenser and passes the refrigerant to the evaporator in a second line; and 2) a refrigerant, by-pass line around the thermal expansion valve having a fixed restrictor for passing a fix amount of refrigerant from the condenser to the evaporator.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 2 is a schematic view illustrating an improved configuration for weak solution flow control from the high to the low pressure side (generator to absorber) of an absorption, heat-transfer machine such as that shown in FIG. 1 using a by-pass loop.

FIG. 3 is a schematic view of an alternate device for improved weak solution flow control from the high to the low pressure side (generator to absorber) of an absorption, heat-transfer machine such as that shown in FIG. 1 using a flow control valve based system.

FIG. 4 is a cross-sectional plan view through the longitudinal axis of the flow control valve of FIG. 3.

FIG. 5 is a schematic view of a refrigerant flow-control device showing a fixed restriction device that allows use of a thermal expansion valve for the flow control of refrigerant from the high to low pressure side (condenser to evaporator).

FIG. 6 is a schematic view of another embodiment of a refrigerant flow-control device showing the use of a thermal expansion valve in parallel with a fixed restriction device that provides for a minimum refrigerant flow rate while allowing the thermal expansion valve to be used for "trim" flow control of refrigerant from the high to low pressure side (condenser to evaporator).

Figure 1:
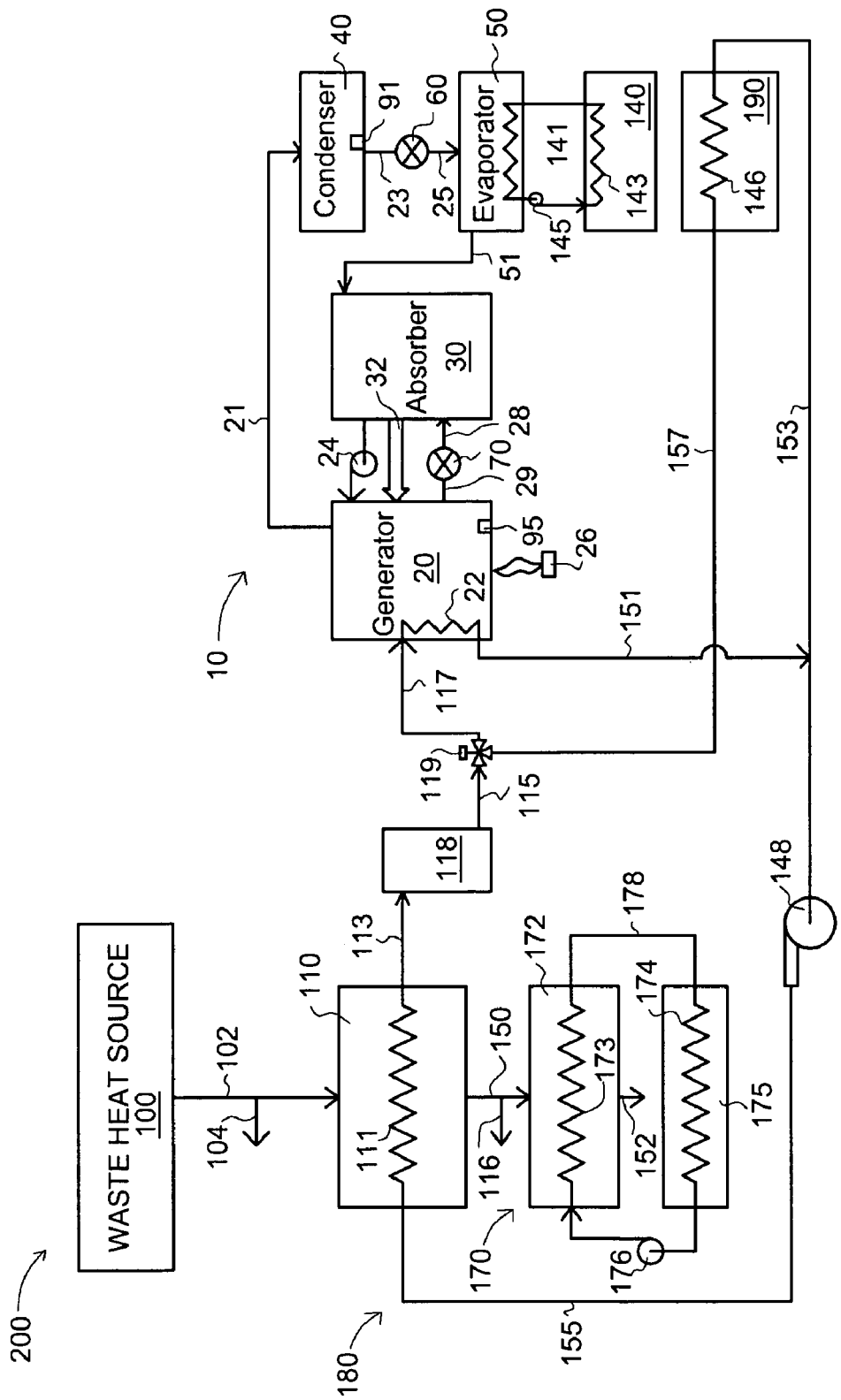
FIG. 1 is a schematic diagram of the present invention illustrating the use of a waste heat source to operate an absorption heat-transfer machine at a generator, solution-pair temperature greater than 250° F. (121° C.) to take advantage of the use of high-temperature solution pairs such as ammonia-water in the absorption machine.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

With reference to the drawings and initially FIG. 1, a waste-heat recovery, heat-transfer device 200 comprises an absorption heat-transfer machine 10 for operation by means of a waste heat source 100 at working-solution (solution pair) temperatures in generator 20 of greater than 250° F. (121° C.). In its basic form, the absorption heat-transfer machine 10 comprises an interconnected generator 20, an absorber, 30, a condenser 40, and an evaporator 50. Expansion (flow control) devices 60, 70 control the flow of fluids from a high pressure to a low pressure component Specifically flow control device 60 controls the flow of refrigerant from the high-pressure condenser 40 to the low-pressure evaporator 50. Flow control device 70 controls the flow of weak solution from the high-pressure generator 20 to the low pressure absorber 30. Solution pump 24 provides strong solution from the absorber 30 to the generator 20.

In operation, a high-temperature solution pair (also here termed the working fluid or strong solution) such as, but not limited to water-ammonia is heated sufficiently in generator 20 by means of a heat source 22 to desorb a refrigerant such as ammonia from the solution pair to leave a weak solution, e.g., water in the case of an ammonia-water solution pair. The refrigerant passes to condenser 40 by means of line 21. Condensation of the refrigerant occurs in condenser 40 with the liberation of heat after which the condensed refrigerant is passed from the high-pressure condenser 40 to the low-pressure evaporator 50 by means of flow control device 60. On heating, the refrigerant evaporates in the evaporator 50 from which it is passed to the absorber 30 by way of line 51. Weak solution, e.g., the water remaining from a water-ammonia solution pair after the ammonia has been desorbed by heating in generator 20, is passed from the high-pressure generator 20 to the low-pressure absorber by means of flow control device 70. The refrigerant is combined with (absorbed in) the weak solution with the liberation of heat in absorber 30 to reconstitute the solution pair (strong solution) which is returned to generator 20 by means of pump 24 to again repeat the process.

As will be appreciated by those skilled in the art, hundreds of variations of the basic absorption cycle that has just been described are known, e.g., single, half, double, triple effect using a variety of solution pairs (working fluids) such as the ammonia-water example noted above. For example, the heat 32 liberated on the recombination of the refrigerant with the weak solution in the absorber may be provided to the generator to assist in the heating of the solution pair in the generator 20 in what is referred to as a generator-absorber heat exchange (GAX) cycle. However, the present invention is not limited to any particular variation of the basic absorption cycle.

In the present invention, the waste heat source 100 must be capable of heating the solution pair in the generator 20 of the absorption machine 10 to a temperature greater than about 250° F. (121° C.). Preferably the waste heat source should be capable of heating the solution pair to a temperature greater than about 300° F. (149° C.) and most preferably to a temperature greater than about 350° F. (177° C.).

The waste heat source 100 is not limited to a single source but rather may include multiple sources. By combining these individual waste heat sources into a single waste heat source 100 and using this single heat source 100 to heat a single, high-temperature heat exchange fluid loop 180, it is possible to service a wide variety of heating needs including one or more high-temperature (at least greater than 250° F. (121° C.) absorption machines, space heating and process heating requirements. The high-temperature loop comprises a heat exchange unit 111 for transferring heat from the waste heat source to the high-temperature heat transfer fluid. Heat exchange unit 22 transfers heat from the high-temperature heat transfer fluid to the solution pair in generator 20 while exchange unit 146 transfers heat from the high temperature heat transfer fluid to a space or process requiring heat. The various heat exchange units 111, 22, and 146 are interconnected by suitable lines through which the high-temperature heat transfer fluid is circulated by means of pump 148. High temperature loop 180 can be used to heat many different spaces and processes including multiple high-temperature absorption machines. All of the heating needs serviced by the high-temperature loop 180 may be generally referred to as the high-temperature heating load. One of the key advantages of combining multiple waste heat sources to afford a single waste heat source 100 that is used to heat a single, high temperature heat exchange fluid loop 180 is the elimination and attendant cost savings afforded by eliminating duplicate parts such as pumps that are required if individual waste heat sources are used to heat individual heating needs.

Cooler waste heat from exchanger 110 can be used to heat an intermediate-temperature heat-exchange loop 170 that services multiple intermediate heating needs including space and process heating as well as lower temperature absorption machines. In FIG. 1 such multiple heating needs may be regarded as the intermediate heating load and designated generally by the numeral 175. Again as with the high-temperature heat exchange loop 180, intermediate-temperature heat-exchange fluid is circulated from the intermediate-heat exchange unit 173 to the various loads 175 by means of appropriate lines and solution pump 176.

Although absorption machines are typically used for cooling purposes, it is to be understood that the present invention also contemplates heat pump type operations in which heat is supplied to the evaporator from the outdoors and the absorber and condenser supply heat for space and process heating.

When the waste heat source 100 is unavailable for heating or incapable of delivering sufficient heat to meet the solution pair heating requirements of the high-temperature absorption machine 10, a second heating source such as a burner 26 may be used as an alternate heating source when the waste heat source 100 is unavailable or to provide supplemental (concurrent) heat when the waste heat source 100 is not fully operational, i.e., insufficient to heat the solution pair in generator 10 to an operating temperature. Refrigerant flow device (system) 60 and weak-solution flow device (system) 70, which will be described further below, may be used with any absorption machine 10 configuration without regard to solution pair heating requirements.

A heated fluid such as combustion products (exhaust gas), or coolant fluids, i.e., waste heat, from a heat source 100 such as but not limited to microturbines, diesel or gas engines, fuel cells, and solar collectors, is passed through a heat exchanger 110 to heat a high-temperature fluid in heat transfer unit 111 to a desired temperature. Heat exchanger 110 provides a high heat transfer coefficient with little waste-heat stream pressure drop so as not to degrade the performance of heat source 100. The high-temperature fluid from heat transfer unit 111 is directed to a heat exchange unit 22 in generator 20 of absorption machine 10 via lines 113, 115, 117.

The evaporator 50 of absorption machine 10, which requires the uptake of heat for the evaporation process, is used to provide cooling to a space or process 140 by direct contact with the space or process 140 (not shown) or more typically by means of interconnected heat exchange units 141, 143, and a pump 145 to circulate a heat transfer fluid to provide heat from the space or process (load) 140 to evaporator 50, i.e., to cool load 140.

Alternately or simultaneously, the heat high-temperature heat transfer fluid from heat transfer unit 111 may be used to provide heat for space or process heating, i.e., to heat a second load 190 by means of three-way valve 119, line 157 and heat-exchange unit 146. The cooled high-temperature heat-transfer fluid from heat-exchange unit 22, or heat-exchange unit 146, or both is pumped back to the high-temperature heat transfer unit 111 by pump 148 and lines 151, 153, 155. An optional bypass line 104 may be used to divert waste heat from heat source 100 prior to entry into heat exchanger 110. An optional thermal storage tank 118 may be used to store hot, high-temperature exchange fluid for situations such as when the waste heat source only provides heat on an intermittent basis.

An intermediate temperature heating loop 170 may be used to take advantage of the intermediate temperature waste heat stream in line 150 coming from exchanger 110. The heat in waste heat stream in line 150 is passed into heat exchanger 172 where the heat is exchanged to a heat exchange fluid in exchange unit 173. The heat exchange fluid passes from heat exchange unit 173 via line 178 to heat exchange unit 174 where it is used to heat a space or processing load 175. The heating fluid from exchange unit 174 is returned to heat exchange unit 173 by means of pump 176. Processing load 175 could be a generator of an absorption heat-transfer machine similar to that described above with regard to absorption unit 10 but operating at a lower temperature, e.g., below 250° F. (121° C.) such as is done with a lithium bromide-water solution pair.

The cooled waste heat fluid stream emerges from heat exchanger 172 via line 152. As with the high-temperature exchanger 110, a by-pass line 116 may be optionally provided for situations in which heating of heat exchanger 172 is not required. As illustrated in FIG. 1, the waste heat fluid stream in lines 104, 116, 152 is illustrated as an open system, that is, the waste heat fluid stream is exhausted to the atmosphere as might be done with the exhaust stream from a diesel or gas combustion engine. However and as will be appreciated by those skilled in the art, the waste heat fluid stream can be provided as a closed-loop system in which a fluid is returned to the waste heat source 100 by means of a circulating pump, as for example, when the waste heat stream is a product of lubricating oil or transmission fluid heating.

As shown in FIG. 1, the flow of weak solution from the high to low pressure side of the absorption heat-transfer machine 10, that is, from the generator 20 to the absorber 30 via lines 29 and 28 may be controlled by fixed or variable flow-control device 70. The simplest method uses a fixed restriction (orifice or capillary tube) through which the flow of weak solution is governed by the pressure difference between the high and low side pressures. This method is hindered by the fact that the flow rate may be lower than desired during low ambients (reduced high-side pressure) or higher than desired during high ambients (increased high-side pressure). This problem is exacerbated when a variable refrigerant-flow restrictor is utilized, i.e., a thermal expansion valve as the thermal expansion valve works to maintain an even low-side pressure. An improved configuration 70' for weak solution flow control is shown in FIG. 2 and uses a by-pass loop controlled by a solenoid valve 54. Solenoid valve 54 has a very low pressure drop and is installed in parallel with a fixed secondary restrictor 53 by means of lines 81 and 82. A primary fixed restrictor 56 is located downstream of the parallel path. That is, and as shown in FIG. 2, the by-pass loop comprises 1) line 81 connected at one end to line 29 upstream of the fixed secondary restrictor 53 and at its opposite end to solenoid valve 54, and 2) line 82 connected at one end to solenoid valve 54 and at its opposite end to line 29 downstream of fixed secondary restrictor 53 and upstream of primary fixed restrictor 56. The solenoid valve 54 is opened or closed by means of controller 55. Controller 55 may use any number of logic signals (from process condition sensors 58) to determine the open or closed position of valve 54. Control point sensors 58 include, but are not limited to, a condenser outlet temperature sensor 91 (FIG. 1), a high-side (generator 20) pressure sensor 92 in line 29, a low-side (absorber 30) pressure sensor 93 in line 28, a high-low pressure differential (pressure sensor 92 signal minus pressure sensor 93 signal), a weak-solution temperature sensor 94 in line 29, or a generator temperature sensor 95 in generator 20 (FIG. 1). Fixed primary restrictor 56 is oversized to provide sufficient flow under start-up and low ambient operation when valve 54 is open. Secondary restrictor 53 is sized to provide correct flow under normal operating conditions when valve 54 closed.

This method of weak-solution control ensures that adequate weak solution flow is available during start-ups and low ambient operation (both during which the high-side (generator) pressure is low). However, this method does not limit the weak solution flow during high ambient conditions (increased high-side (generator) pressure). That is, the increased pressure encountered during high ambient conditions forces too much weak solution through secondary restrictor 53. Primary restrictor 56, being oversized for low pressure operation, does little to impede the increased flow under high-pressure conditions.

FIGS. 3 and 4 illustrate an alternate device 70" for control of weak solution flow from generator 20 to absorber 30. A cylindrical flow control valve 57 is used to maintain the flow rate constant over a wide range of inlet and outlet pressures. Valve 57 is installed upstream of a fixed primary orifice 58 and is designed to provide a variable restriction ranging from 5-50% of the total required pressure drop. The weak solution enters valve 57 housing 89 through the inlet cap 66 and then enters piston 83 which is moveably mounted in bore 72 formed in housing 89. Piston 83 has an internal flow path 84 in which a fixed flow control orifice 62 is inserted. As illustrated, the flow path 84 composes a longitudinal bore with an as co-extensive with the axis of the piston 83 and formed in the piston 83 and valve stem 64 and a radial exit bore connecting at a right angle with the longitudinal bore. As illustrated, the flow control orifice 62 is formed in plug 85 that is inserted into a bore 88 in piston 83 and sealed by means of seal 86. The flow control orifice 62 is sized such that when the desired flow rate is achieved, a known pressure drop is obtained. This known pressure drop exerts a known force differential across the piston 83 which in turn exerts a known force on spring 63. Compression of spring 63, which surrounds valve stem 64 and contacts a ledge 89 of housing 59 at one end and an end of piston 83, moves the tapered valve stem 64 forward into the orifice hole 65 formed in outlet cap 67. If the flow increases, the differential pressure across the flow control orifice 62 increases and pushes the piston 83 forward and the valve stem 64 farther into the orifice hole 65. This increases the resistance to flow through the stem-impeded orifice hole 65 thereby reducing the flow rate. As a result, the flow control valve 57 constantly works to maintain a given flow rate based on the flow control orifice 62, piston 83 diameter, spring 63 constant, and valve stem 64 taper. Seals 61 on the piston 83 prevent by-pass flow but allow the piston 83 to move freely within annular housing 59. This method of weak solution control ensures that adequate weak solution flow is available at all times without the harsh step-type control of on/off solenoid valve 54. Flow control valve 57 controls the flow continuously over the entire range of pressures or can become a fixed orifice above a certain high-low pressure differential.

Thermal expansion valves are widely used as a control device for flow control of refrigerant from the high to low pressure side of air conditioning and refrigerating machines based on a vapor-compression cycle. These valves improve the performance of vapor-compression devices over a wide range of operating conditions by metering in the exact amount of refrigerant to the evaporator as called for by the load.

Absorption, heat-exchange machines such as device 10 shown in FIG. 1 typically do not use a thermal expansion valve as a flow-control device 60 in controlling refrigerant flow between the condenser 40 and evaporator 50 because of their high cost. However, with the demand for higher efficiency HVAC (Heating, Ventilating, and Air Conditioning) equipment and the need to meet the high ambient markets of the American Southwest, the use of a thermal expansion valve in absorption machines, especially absorption machines using an ammonia-water solution pair is now justified. However, commercially available thermal expansion valves for ammonia are sized (internal restriction) for vapor-compression systems which have a lower high-low side differential operating pressure. Thus a thermal expansion valve designed for 5 RT (refrigeration ton) load in a vapor compression system is capable of 7.5 RT in an absorption, heat-exchange machine. Thermal expansion valves that are oversized do not function well and result in poor flow control. Smaller thermal expansion valves do not match up well in an absorption machine and the resulting higher flow velocities cause premature failure of the valve.

As shown in FIG. 5, a solution to this problem is to use a flow control device 60' that comprises a fixed restrictor 68 and a thermal expansion valve 69. The fixed restrictor 68 is inserted in front of the thermal expansion valve 69 with its associated controller 71 so that the differential pressure seen by thermal expansion valve 69 is close to its design point. The preliminary fixed orifice 68 must be sized to provide enough restriction to allow the thermal expansion valve to operate properly under normal operating conditions as well as allowing enough flow at low ambients (reduced high-side (condenser) pressure).

FIG. 6 illustrates another version of a refrigerant flow control device 60" that allows adaptation of a vapor-compression, thermal expansion valve to an absorption, heat-transfer machine. In this case, the thermal expansion valve 69 is installed in parallel with a fixed restrictor 68. The fixed restrictor allows a fixed amount of "base" refrigerant flow under all operating conditions thereby allowing the thermal expansion valve 69 to provide a final "trim" flow based on the evaporator operating conditions sensed by sensor 71. This arrangement allows a smaller size thermal expansion valve 69 to be used thereby reducing valve cost and also ensures a minimal amount of refrigerant flow which in turn ensures a minimal solution flow in the absorption machine 10 even when the thermal expansion valve 69 senses that it should be closed.

It is possible that changes in configurations to other than those shown could be used but that which is shown is preferred and typical. Without departing from the spirit of this invention, various absorption, heat-transfer cycles and heat exchange devices may be used.

It is therefore understood that although the present invention has been specifically disclosed with the preferred embodiment and examples, modifications to the design concerning sizing, shape, and interconnection of components and heat-transfer among components will be apparent to those skilled in the art and such modifications and variations are considered to be equivalent to and within the scope of the disclosed invention and the appended claims.

What is claimed is:

1. An absorption, heat-transfer system comprising:
   a) a first absorption heat-transfer system comprising a first generator, an absorber, a condenser, and an evaporator operatively connected together;
   b) a first flow control device located between said generator and said absorber and controlling the flow of a weak solution from said generator to said absorber;
   c) a second flow control device located between said condenser and said evaporator and controlling the flow of a refrigerant from said condenser to said evaporator;
   d) a waste-heat source;
   e) a waste heat steam;
   f) a high-temperature heat exchanger;
   g) a solution pair in said first generator;
   h) a first heat exchange unit in said first generator;
   i) a first heating load;
   j) an operationally connected high-temperature heat-exchange loop comprising:
      1) a first pump;
      2) a second heat exchange unit in said high-temperature heat exchanger;
      3) a high-temperature heat-transfer fluid;
      4) said first heat exchange unit in said first generator; and
      5) a third heat-exchange unit operationally connected to said high-temperature heat-exchange loop;
   k) said waste heat source passing said waste heat stream to said high-temperature heat exchanger for heating said solution pair in said first generator to a temperature of at least about 250° F. (121°C.) via said first heat exchange unit in said generator, said first heat exchange unit operationally connected to said high-temperature heat-exchange loop with said second heat exchange unit in said high-temperature heat-exchange loop and in said high-temperature heat exchanger heating said high-temperature heat-transfer fluid with said waste heat stream from said waste-heat source;
   l) an intermediate-temperature heat exchanger;
   m) a second load;
   n) an operationally connected intermediate-temperature heat-exchange loop comprising:
      (1) a second pump;
      (2) a fourth heat exchange unit in said intermediate temperature heat exchanger;
      (3) a fifth heat-exchange unit for heating said second load via said waste heat stream emerging from said high-temperature exchanger; and
      (4) an intermediate heat-transfer fluid;
   o) said waste heat source passing said waste heat stream to said high-temperature heat exchanger for heating at least one of the following:
      (1) said first heating load via said third heat-exchange unit operationally connected to said high-temperature heat-exchange loop; and
      (2) said intermediate-temperature heat-exchange loop comprising said said fifth heat-exchange unit for heating said second load via said waste heat stream emerging from said high-temperature heat exchanger.

2. The absorption, heat-transfer system according to claim 1 wherein said solution pair in said first generator is heated to a temperature of at least about 300° F. (149° C.) via said heat exchange unit in said generator.

3. The absorption, heat-transfer system according to claim 1 wherein said solution pair in said first generator is heated to a temperature of at least about 350° F. (177° C.) via said heat exchange unit in said generator.

4. The absorption, heat-transfer system according to claim 1 wherein said solution pair in said generator is water and ammonia.

5. The absorption, heat-transfer system according to claim 1 further comprising a second heat source for heating said generator of said first absorption, heat-transfer machine.

6. The absorption, heat-transfer system according to claim 1 further comprising a first line for passing at least a portion of said high-temperature heat-transfer fluid to said heat exchange unit in said generator of said absorption heat-transfer machine and a second line for passing at least a portion of said high-temperature heat-transfer fluid to said third heat exchange unit for heating said first heating load.

7. The absorption, heat-transfer system according to claim 6 wherein said high-temperature heat transfer fluid is passed to said heat exchange unit in said first generator and to said third heat exchange unit via three-way valve.

8. The absorption; heat-transfer system according to claim 1 further comprising a thermal storage tank for storing said high-temperature heat-transfer fluid after heating by said waste-heat stream.

9. The absorption, heat-transfer system according to claim 1 wherein said high-temperature heat-transfer fluid is heated by said waste-heat stream in said high-temperature heat-exchanger via a line connected to said waste heat source, said line having a high-temperature heat-exchanger by-pass line.

10. The absorption, heat-transfer system according to claim 1 wherein said intermediate-temperature heat-transfer fluid is heated by said waste-heat stream in said intermediate-temperature heat-exchanger via a line connected to said high-temperature heat-exchanger, said line having an intermediate-temperature heat-exchanger by-pass line.

11. The absorption, heat-transfer system according to claim 1 with said waste-heat stream heating said intermediate-temperature heat-transfer fluid in said intermediate-temperature heat exchanger; said intermediate heat-transfer fluid heating said second load with said second load comprising at least one of the following:
   a) a space;
   b) a processing load; and
   c) a second absorption heat-transfer machine.

12. The absorption, heat-transfer system according to claim 11 with said intermediate heat-transfer fluid heating said space.

13. The absorption, heat-transfer system according to claim 11 with said intermediate heat-transfer fluid heating said processing load.

14. The absorption, heat-transfer system according to claim 11 with said intermediate heat-transfer fluid heating said second absorption heat-transfer machine.

15. The absorption, heat-transfer system according to claim 1 with said first flow control device comprising:
   a) a first restrictor receiving said weak solution from a first line connected to said generator and passing said weak solution to said absorber with a second line;
   b) a second restrictor located in said first line between said generator and said first restrictor;
   c) a weak solution, by-pass line around said first restrictor comprising an on-off flow device.

16. The absorption, heat-transfer system according to claim 15 wherein said on-off flow device is operated by a controller.

17. The absorption, heat-transfer system according to claim 16 wherein said controller is connected to an absorption cycle sensor.

18. The absorption, heat-transfer system according to claim 1 with said first flow control device comprising:
   a) a fixed restrictor receiving said weak solution from a first line connected to said generator and passing said weak solution to said absorber with a second line;
   b) a variable restrictor positioned in said first line between said generator and said first fixed restrictor.

19. The absorption, heat-transfer system according to claim 18 with said variable restrictor comprising:
   a) a housing having a cylindrical bore formed therein for receiving said weak solution at a first end and outputting said weak solution at a second end;
   b) a cylindrical piston with a first end and second end;
      1) moveably mounted in said cylindrical bore and having a common longitudinal axis with said cylindrical bore;
      2) having a bore formed therein to pass said weak solution from said first end to said second end; and
      3) having a valve stem at said second end; said valve stem moveably engaging an orifice in said second end of said housing; and
   c) a helical spring positioned around said valve stem and contacting said second end of said piston at one end and a shoulder of said housing at a second end.

20. The absorption, heat-transfer system according to claim 1 with said second flow control device comprising:
   a) a thermal expansion valve receiving said refrigerant from a first line connected to said condenser and passing said refrigerant to said evaporator with a second line; and
   b) a fixed restrictor located in said first line between said condenser and said thermal expansion valve to reduce the inlet pressure to said thermal expansion valve.

21. The absorption, heat-transfer system according to claim 1 with said second flow control device comprising:
   a) a thermal expansion valve receiving said refrigerant from a first line connected to said condenser and passing said refrigerant to said evaporator with a second line; and
   b) a refrigerant, by-pass line around said thermal expansion valve comprising a fixed restrictor for passing a fixed amount of refrigerant from said condenser to said evaporator.

22. A weak-solution flow control device in a first absorption heat-transfer system comprising a generator, an absorber, a condenser, and an evaporator operatively connected together, said flow control device comprising:
   a) a first restrictor receiving a weak solution from a first line connected to said generator and passing said weak solution to said absorber with a second line;
   b) a second restrictor located in said first line between said generator and said first restrictor; and
   c) a weak solution, by-pass line around said second restrictor, said by-pass line connected at one end to said first line upstream of said second restrictor and at a second end to said first line downstream of said second restrictor and upstream of said first restrictor and comprising an on-off flow device.

23. The weak-solution flow control device according to claim 22 wherein said on-off flow device is operated by a controller.

24. The weak solution flow control device according to claim 23 wherein said controller is connected to at least one absorption cycle sensor.

25. A weak-solution flow control device in an first absorption heat-transfer system comprising a generator, an absorber, a condenser, and an evaporator operatively connected together, said flow control device comprising:
- a) a fixed restrictor receiving a weak solution from a first line connected to said generator and passing said weak solution to said absorber with a second line;
- b) a variable restrictor positioned in said first line between said generator and said first fixed restrictor, with said varible restrictor comprising:
  1) a housing having a cylindrical bore formed therein for receiving said weak solution at a first end and outputting said weak solution at a second end;
  2) a cylindrical piston with a first end and second end; said cylindrical piston:
     a) moveably mounted in said cylindrical bore and having a common longitudinal axis with said cylindrical bore;
     b) having a bore formed therein to pass said weak solution from said first end to second end; and
     c) having a valve stem at said second end; said valve stem moveably engaging an orifice in said second end of said housing; and
  3) a helical spring positioned around said valve stem and contacting said second end of said piston at one end and a shoulder of said housing at a second end.

26. A refrigerant flow control device in a first absorption heat-transfer system comprising a generator, an absorber, a condenser, and an evaporator operatively connected together, and flow control device comprising:
- a) a thermal expansion valve receiving a refrigerant from a first line connected to said condenser and passing said refrigerant to said evaporator with a second line; and
- b) a fixed restrictor located in said first line between said condenser and said thermal expansion valve to reduce the inlet pressure to said thermal expansion valve.

27. A refrigerant flow control device in a first absorption heat-transfer system comprising a generator, an absorber, a condenser, and an evaporator operatively connected together, said flow control device comprising:
- a) a thermal expansion valve receiving a refrigerant from a first line connected to said condenser and passing said refrigerant to said evaporator with a second line; and
- b) a refrigerant, by-pass line around said thermal expansion valve comprising a fixed restrictor for passing a fix amount of refrigerant from said condenser to said evaporator.

* * * * *